United States Patent [19]

Ng

[11] Patent Number: 5,262,854
[45] Date of Patent: Nov. 16, 1993

[54] LOWER RESOLUTION HDTV RECEIVERS

[75] Inventor: Sheau-Bao Ng, Cranbury, N.J.

[73] Assignee: RCA Thomson Licensing Corporation, Princeton, N.J.

[21] Appl. No.: 839,161

[22] Filed: Feb. 21, 1992

[51] Int. Cl.[5] ...................... H04N 7/133; H04N 7/137
[52] U.S. Cl. .................................. 358/133; 358/105; 358/136
[58] Field of Search ................. 358/105, 133, 135, 136

[56] References Cited

U.S. PATENT DOCUMENTS

| | | | |
|---|---|---|---|
| 4,661,862 | 4/1987 | Thompson | 358/133 |
| 4,700,226 | 10/1987 | Acampora | 358/136 |
| 4,829,378 | 5/1989 | LeGall | 358/133 |
| 4,864,396 | 9/1989 | Martens | 358/135 |
| 5,028,995 | 7/1991 | Izawa et al. | 358/105 |
| 5,031,053 | 7/1991 | Chamzas | 358/426 |
| 5,043,808 | 8/1991 | Knauer et al. | 358/133 |
| 5,048,111 | 9/1991 | Jones et al. | 382/56 |
| 5,122,875 | 6/1992 | Raychaudhuri et al. | 358/133 |
| 5,148,272 | 9/1992 | Acampora et al. | 358/135 |
| 5,155,594 | 10/1992 | Berstein et al. | 358/135 |

OTHER PUBLICATIONS

S. Inoue et al., "Encoding and Decoding in the 6-MHz NTSC-Compatible Widescreen Television System", IEEE Trans. on Circuits and Systems for Video Technology, vol. 1, No. 1, Mar. 1991, pp. 49–57.

Kou-Hu Tzou et al., "Compatible HDTV Coding For Broadband ISDN", IEEE Global Telecommunications Conference & Exhibition, Hollywood, Fla., Nov. 28–Dec. 1, 1988, conference record, vol. 2 of 3.

Primary Examiner—Tommy P. Chin
Assistant Examiner—Richard Lee
Attorney, Agent, or Firm—Joseph S. Tripoli; Eric P. Herrmann; Ronald H. Kurdyla

[57] ABSTRACT

A receiver for receiving block coded HDTV compressed digital video signals decimates the data in each block to produce NTSC resolution images but with a significant savings in receiver hardware.

20 Claims, 6 Drawing Sheets

LOWER RESOLUTION HDTV RECEIVERS

This invention is directed to high definition television (HDTV) receivers and more particularly to television receivers which are responsive to HDTV signals but are of lower cost and are of quality commensurate with NTSC receivers.

BACKGROUND OF THE INVENTION

The systems proposed and currently being evaluated for the future HDTV system of the United States of America, are primarily digital and provide relatively high resolution images. Since the signals are digital and of relatively high resolution, receivers designed to process such signals will require significant amounts of state of the art hardware, including a significant amount of video memory (VRAM). Until the technology matures, which may take ten to fifteen years, this hardware will render the HDTV receivers expensive, probably so much so as to preclude purchase by middle class families of more than one receiver per home. However most middle class families are accustomed to having a plurality of receivers in their homes. Thus there is a need for a lower cost HDTV receiver in the nearer term.

The present inventor realized that it is possible to provide a lower cost receiver of HDTV signals but at the sacrifice of some image resolution. Such receivers will still have advantages over NTSC receivers in that they will not suffer the common NTSC shortcomings such as crosscolor and crossluma, and being digital will be compatible with other digital apparatus such as home computers.

A typical HDTV signal may represent images with 1050 lines and 1440 pixels per line. A typical HDTV receiver may require, for example, four VRAMS for processing decoded signal and further memory to buffer several fields of compressed data. Considering eight bit samples, the four VRAMS will require 48.38 Mbits of very fast memory. Alternatively if the HDTV signal is decoded to normal NTSC resolution of 525 lines with 910 pixels per line, only 15.29 Mbits of slower VRAM are required, or approximately one third of that required for the high resolution image. The requirement of less memory and slower memory can effect a significant cost savings in a lower resolution receiver.

SUMMARY OF THE INVENTION

The present invention is receiver apparatus for accepting an HDTV signal of relatively high resolution and exploiting only a portion of the data in the signal to produce a signal representing an image of lesser resolution to effect a reduction in the hardware required to reproduce an image.

DETAILED DESCRIPTION

The invention will be described in terms of a compressed digital television signal of the form proposed by the ATRC, which is similar to the standard proposed by the Motion Picture Experts Group (MPEG) and detailed in the document "International Organization for Standardization", ISO-IEC JT(1/SC2/WG1), Coding of Moving Pictures and Associated Audio, MPEG 90/176 Rev.2, Dec. 18, 1990. This signal is hierarchically layered and of the form illustrated in FIG. 1. It will be appreciated that the invention is not limited to use with this signal, but is applicable to at least signals having similar formats.

Figure 1:
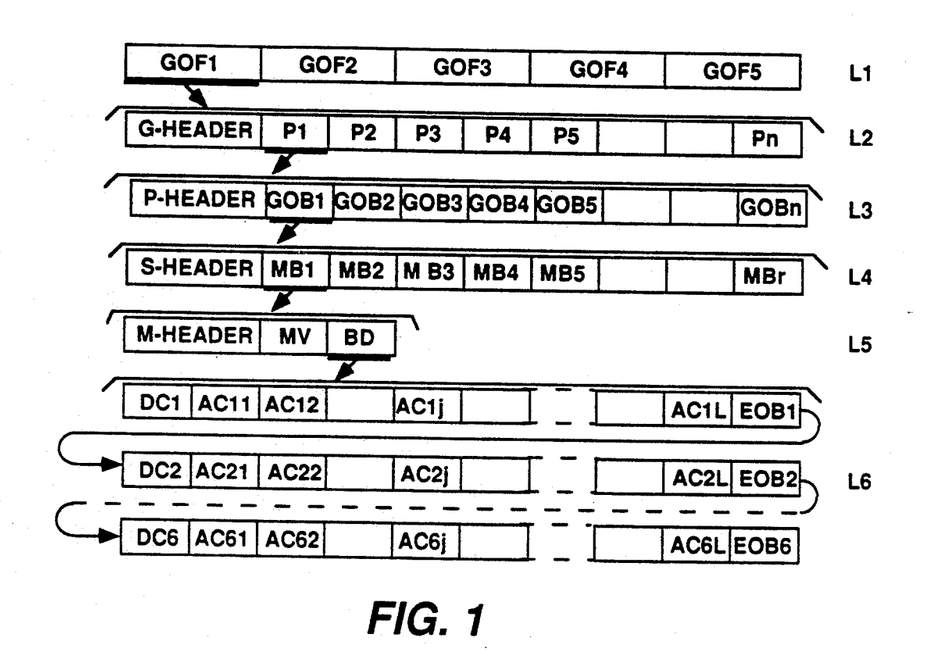
FIG. 1 is a pictorial representation of a layered signal useful in describing the invention.

Referring to FIG. 1, there is shown diagrammatically, the general form of an MPEG compressed television signal. The signal is arranged in successive groups of pictures GOPi, each of which includes compressed data from a like number of image frames. The groups of pictures are indicated in the top row of boxes designated L1. Each GOP (L2) includes a header followed by segments of picture data. The GOP header includes data related to the horizontal and vertical picture size, the aspect ratio, the field/frame rate, the bit rate, etc.

The picture data (L3) corresponding to respective fields/frames includes a picture header followed by slice data (L4). Respective slices, GOBi, include image information for contiguous image areas, for example each GOB may include data representing 16 consecutive horizontal image lines. The picture header includes a field/frame number and a picture code type. Each slice (L4) includes a header identifying its location in an image, followed by a plurality of macroblocks of data MBi. The slice header may also include a group number and a quantization parameter.

Macroblocks contain image representative data for portions of a slice. A typical macroblock in the MPEG format represents an image area covering a matrix of 16 by 16 pixels. The macroblock is actually comprised of 6 blocks, four of which convey luminance information and two of which convey chrominance information. Each of the four luminance blocks represent an 8 by 8 matrix of pixels or one quarter of the 16 by 16 matrix. Each of the chrominance blocks is an 8 by 8 matrix representing the entire 16 by 16 matrix of pixels. The respective blocks contain Discrete Cosine Transform (DCT) coefficients generated from respective matrices of pixel data. For example each luminance block, generated from an 8 by 8 pixel matrix, may contain as many as 8 times 8 or 64 DCT coefficients. One coefficient conveys DC or average brightness information, and each of the remaining coefficients convey information related to different image spatial frequency spectra. The coefficients are arranged in a particular order with the DC coefficient first and the remaining coefficients in order of spectral importance. Many images may contain little detail resulting in many of the DCT coefficients being zero valued. In the hierarchy of coefficients in respective blocks, all zero valued coefficients following the last non zero valued coefficient are deleted from the block data and an end of block code (EOB) is inserted after the last non zero valued coefficient. In addition zero valued coefficients occurring before the last non zero valued coefficient are run length coded. Hence there may be less than 64 coefficients in a block of data.

Each macroblock MBi (L5) includes a header followed by motion vectors and coded coefficients. The MBi headers include a macroblock address, a macroblock type and a quantization parameter. The coded coefficients are illustrated in layer L6. Much of the data, including DCT coefficients and header data is variable length coded. In addition some of the data, such as the DC DCT coefficients and motion vectors are DCPM coded.

The data shown in FIG. 1 will typically be shuffled to lessen the impact of block errors, and reformatted into transport packets of fixed numbers of bytes to facilitate synchronization at the receiver. In addition, the transport packets of data will be error encoded, with for example a Reed-Soloman coder, and parity check bits appended.

Figure 2:
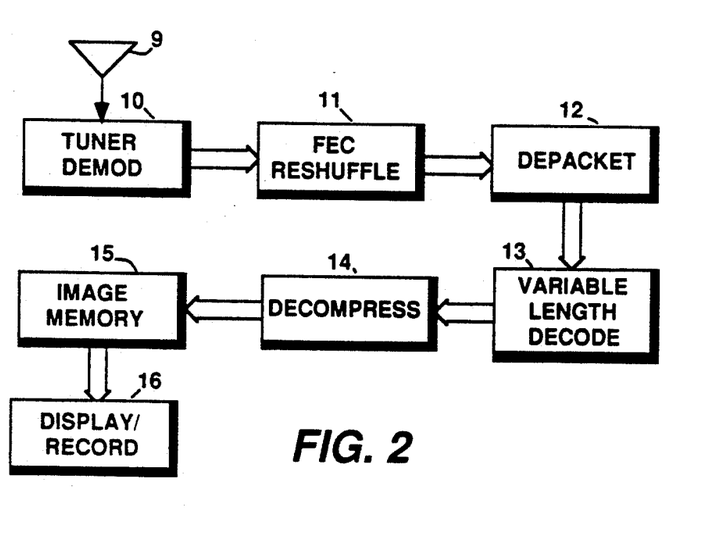
FIG. 2 is a block diagram of a typical television receiver of the type for processing compressed digital television signals.

FIG. 2 illustrates the general form of an HDTV receiver. Broadcast HDTV signals are received by an antenna 9 and applied to a tuner-demodulator 10. The output of the tuner-demodulator is a digital bit stream which is applied to a forward error corrector and reshuffler 11. The forward error corrector and reshuffler 11 includes, for example a Reed-Soloman error corrector, for detecting and correcting data errors incurred during signal transmission, and apparatus for providing inverse data shuffling. The error corrected, reshuffled data is applied to an element 12 which decomposes the transmission packet format, placing the data in the general sequence illustrated in FIG. 1. The error correction, reshuffle and depacketing functions may occur in a different sequence, which sequence will be the reverse order of the reciprocal functions performed at the transmitter.

The reformatted data is applied to a variable length decoder 13 wherein the variable length encoded data is decoded, and any run length encoded data is decoded. The decoded data is applied to a decompresser 14 which transforms the compressed image data to raster pixel data and applies the pixel data to an image memory or VRAM. The pixel data in the VRAM is thereafter applied to a display device, recorder or other video signal utilization apparatus.

Figure 3:
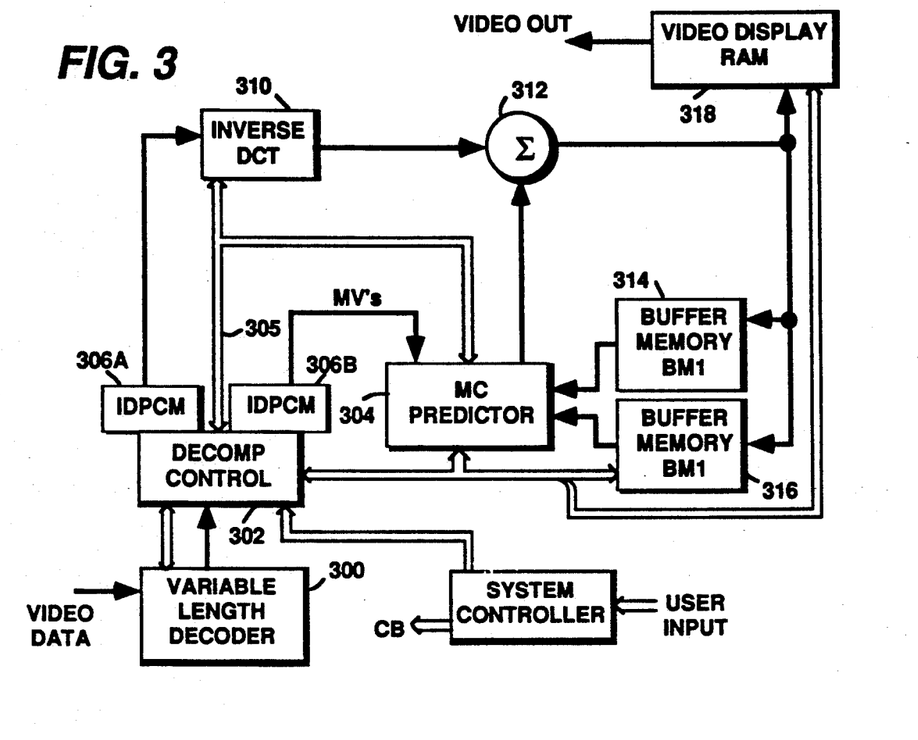
FIG. 3 is a block diagram of decompression apparatus which may be incorporated in element 14 of FIG. 2, in the context of a HDTV receiver.

FIG. 3 illustrates exemplary decompression apparatus arranged to process video data in MPEG-like format. The FIG. 3 system is similar to a wide variety of known motion compensated predictive video decoders and thus a detailed description will not be provided herein. In FIG. 3 data provided by the variable length decoder 300 is applied to a decompression controller 302. Incorporated in the controller are inverse DPCM coder 306A and 306A. The controller 302, extracts the header data from the compressed video data, to program its decompression sequences. Typically the controller is a state machine programmed to perform particular routines subject to certain variables which are included in the header data.

The controller 302 directs coefficient data through the inverse DPCM coder 306A wherein appropriate codewords are passed unaltered or decoded as required. Motion vector data is directed through the inverse DPCM coder 306B, wherein the vectors are decoded.

The decoded motion vectors are coupled to the motion compensated predictor 304, and the coefficients are coupled to the inverse DCT apparatus or IDCT 310. The IDCT apparatus, responsive to blocks of coefficients generates 8 by 8 matrices of pixel information, which is applied in predetermined order to an adder 312. Output data from the adder 312 corresponds to decompressed pixel values. These values are input to a display memory (VRAM) 318, from which they may be applied to a display device. The output values from adder 312 are also applied to a pair of buffer memories or VRAM's 314 and 316. The memories 314 and 316 each have sufficient capacity to store one image frame of pixel data. The VRAM's 314 and 316 are coupled to the predictor 304. The predictor 304, responsive to motion vectors, accesses appropriate 8 by 8 blocks of pixel data from the VRAM's 314, 316 or both and applies same to the adder 312.

In general, in an MPEG-like system data representing predetermined frames is intraframe encoded, and data representing the remaining frames is interframe encoded. The data representing intraframe encoded frames is generated by segmenting pixel values into respective 8 by 8 blocks and performing the DCT on the pixel data. Alternatively data representing interframe encoded frames is generated by predicting image frames from preceding frames, following frames, or both; determining the differences (residues) between the predicted and actual frames; and performing the DCT on 8 by 8 blocks of residue data. Thus intraframe DCT coefficients represent image data, and interframe DCT coefficients represent frame difference data. No motion vectors are generated for intraframe encoded frames. Motion vectors, for interframe encoded frames, are codewords which identify 8 by 8 blocks of pixels in frames from which predicted frames are generated, which blocks most closely match the block currently being processed in the frame currently being encoded. For a more detailed explanation of an MPEG-like coding/decoding process, the reader is directed to U.S. Pat. No. 5,122,875.

Referring again to FIG. 3, when intraframe encoded frames (I) are being processed, the predictor 304 is conditioned to apply zero values to the adder 312. The inverse DCT processed data provided by the IDCT 310 corresponds to blocks of pixel values. These values are passed unaltered by the adder 312, and are loaded in the VRAM 318 for display, and loaded in one of the VRAM's 314 or 316 for use in predicting subsequent frames. Immediately after an I frame is decoded, an interframe encoded frame (P) corresponding to a frame occurring a predetermined number of frames after the I frame, is available from the variable length decoder. This P frame was, at the encoder, predicted from the preceding I frame. The DCT coefficients of the P frame thus represent residues, which when added to the pixel values of the decoded I frame, will generate the pixel values for the current P frame. On decoding this P frame, the IDCT 310 provides decoded residue values to the adder 312, and the predictor 304, responsive to the motion vectors, accesses the corresponding blocks of pixel values of the I frame from VRAM and applies them in appropriate order to the adder 312. The sums provided by the adder are the pixel values for this P frame. These pixel values are loaded into the display RAM 318, and into the one of the VRAM's 314 or 316 that is not storing the decoded I frame pixel values.

Subsequent to the decoding of the P frame, the encoded frames (B frames) which normally occur intermediate the I and P frame are provided, which frames have been interframe encoded and thus are decoded similarly to the P frame. However decoded B frame data is not stored in the VRAM's 314 and 316, as decoded B frame data is not used to predict other frames.

Figure 4:
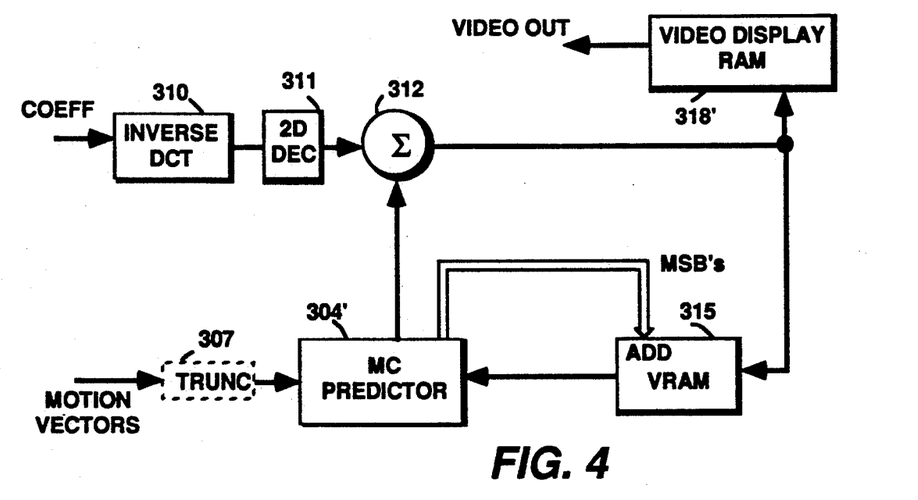
FIGS. 4, 5, 7 and 8 are block diagrams of alternate embodiments of decompression circuitry embodying the invention.

FIG. 4 illustrates a first embodiment of the invention. FIG. 4 includes a portion of the relevant apparatus of FIG. 3 in abbreviated form, and elements of FIG. 4 designated with the same numbers as elements in FIG. 3 are similar. In FIG. 4 a two dimensional decimator 311 has been interposed between the IDCT 310 and the adder 312. The decimator 311 includes a subsampler to eliminate, for example, every other row of values and every other value (pixel values or pixel residue) in the remaining rows of the pixel matrices provided by the IDCT, to reduce the pixel data points by a factor of 4. The subsampling may be arranged to eliminate vertically aligned pixel data or according to a quincunx format to provide higher effective resolution in the reduced data. The decimator may also include a low pass filter to preclude aliasing by the subsampling process. Other subsampling formats may be employed. However if subsampling is performed by simply dropping pixel values, then the subsampling factors are limited to powers of two. Alternatively if subsampling is performed by interpolation, a wide selection of decimation factors may be accommodated.

Since the data has been reduced by a factor of 4, the buffer or VRAM memory capacity is reduced by a factor of 4 relative to the FIG. 3 apparatus. The VRAM 315 shown in FIG. 4 will generally be of the form of the memory elements 314 and 316 shown in FIG. 3. Note however that even in FIG. 3 the two memory sections 314 and 316 may be realized by a single memory element or a multiplicity of memory elements.

The speed requirements of the circuitry following the decimator 311 is similarly reduced. The predictor 304' differs from the predictor 304 in FIG. 3 in that, responsive to the motion vectors, it accesses e.g., 4 by 4 matrices of pixel values from memory rather than 8 by 8 matrices. A further difference resides in the addressing structure. Nominally the predictor generates addresses, or at least a starting addresses for accessing matrices of pixels identified by the motion vectors. The reduced size VRAM will not have address locations (and thus addresses) corresponding to all possible addresses represented by the motion vectors. This may be accommodated however, by generating addresses in the predictor as for the larger memory structure, but using only the more significant bits of the generated addresses. For the case where the data is decimated by a factor of two in both the horizontal and vertical directions, this entails applying all but the least significant bit of the vertical and horizontal address values to the VRAM address busses. Alternatively the motion vectors may be truncated before being applied to the predictor as indicated by the truncation element 307.

Figure 5:
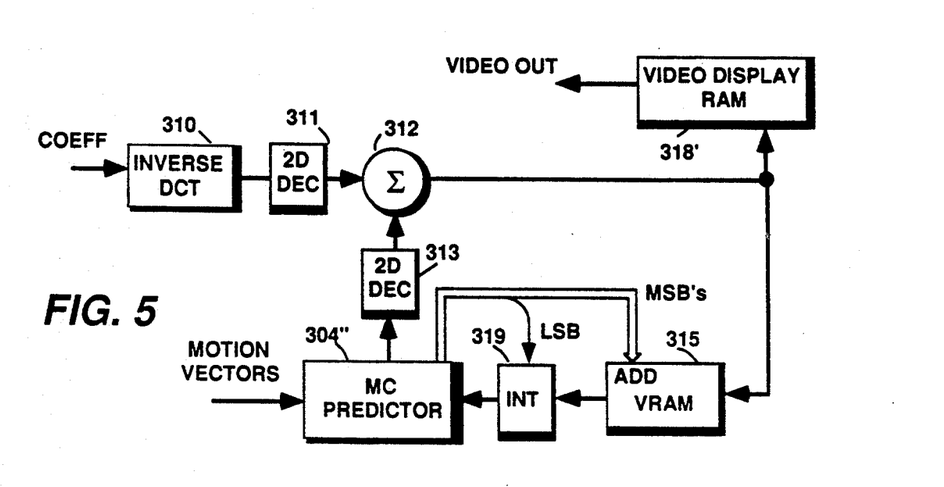

FIG. 5 illustrates a further embodiment which produces improved images over the FIG. 4 embodiment. The improvement results because advantage is taken of the total motion vectors not truncated motion vectors or the affects of truncating memory addresses to the VRAM 315. In FIG. 5 an interpolator 319 is interposed between the VRAM 315 and the predictor 304. In addition a two dimensional decimator 313, similar to decimator 311, is interposed between the predictor 304 and the adder 312. The interpolator 319 accepts blocks of data from the VRAM 315 and generates 8 by 8 blocks which are coupled to the predictor. The predictor couples the 8 by 8 blocks of data to the decimator 313 which subsamples the data back down to 4 by 4 blocks of data in conformance with the data format applied to the adder from decimator 311.

Figure 6:
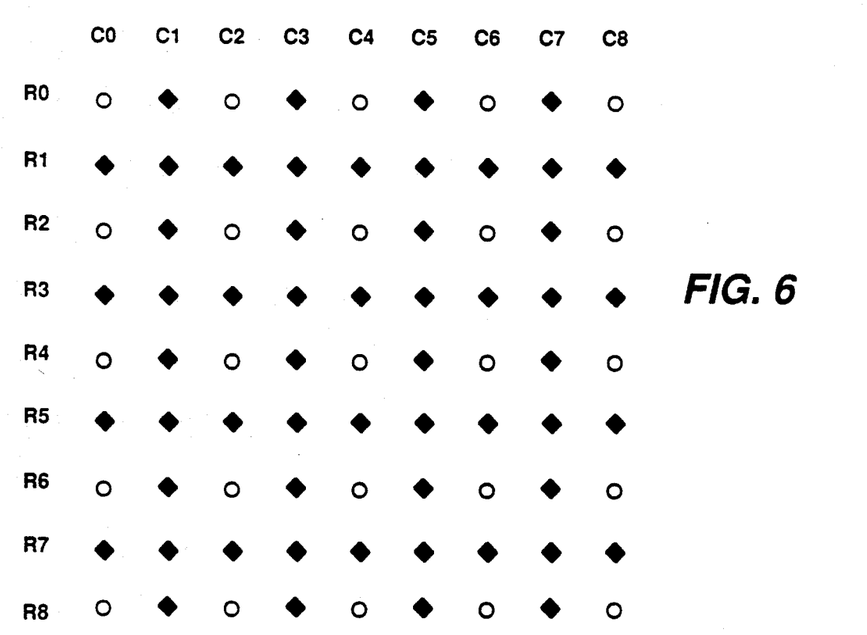
FIG. 6 is a pictorial representation of an exemplary sample format provided by the interpolator 319 of FIG. 5.

To understand how this process improves image reconstruction accuracy refer to FIGS. 5 and 6. FIG. 6 represents the algorithm performed by the interpolator 319. For this exemplary algorithm it is assumed that 5 by 5 blocks of data are accessed from the VRAM 315 rather than 4 by 4 blocks. The 4 by 4 block of data that a truncated address would access is included in the upper left hand corner of the 5 by 5 block that is accessed from the VRAM. The 5 by 5 block of data accessed from memory is represented in FIG. 6 by the open circles. The black diamonds represent interpolated values. The interpolated values may be generated by any of the known two dimensional interpolation techniques. For example the interpolated values in the even numbered rows R0, R2, R4, R6 and R8, may be generated by averaging the two values between which the interpolated values are disposed. The interpolated values in the odd numbered rows may be generated by averaging the values above and below the respective interpolated values. The matrix of values shown in FIG. 6 is comprised of 9 rows and 9 columns. The interpolator provides a matrix of 8 rows and 8 columns to the predictor 304. Hence, there is possibility of a choice of data. In this example the choice is determined by the least significant bit, LSB, of the starting point address generated by the predictor for accessing the block of data from the VRAM 315. If the LSB of the vertical address is even or logical zero, the matrix output by the interpolator includes rows R0-R7. If the LSB of the vertical address is odd or logical one, the matrix output includes rows R1-R8. Similarly, if the LSB of the horizontal or column addressed is even (odd) the matrix output includes columns C0-C7 (C1-C8). In the decimated domain the choice of alternate matrices, which are relatively displaced by a row and/or column, provides a half pixel improvement (with respect to subsampled images) in the accuracy of the reconstructed reduced resolution image.

Alternative interpolator apparatus may be utilized for element 319, which apparatus will determine the size (e.g., 4×4, 5×5, 6×6) of the matrices accessed from the VRAM 315.

The FIG. 5 embodiment has the advantages of reduced memory, slightly enhanced resolution and lessened computational speed requirements for the circuit elements following the decimator 311.

Figure 7:
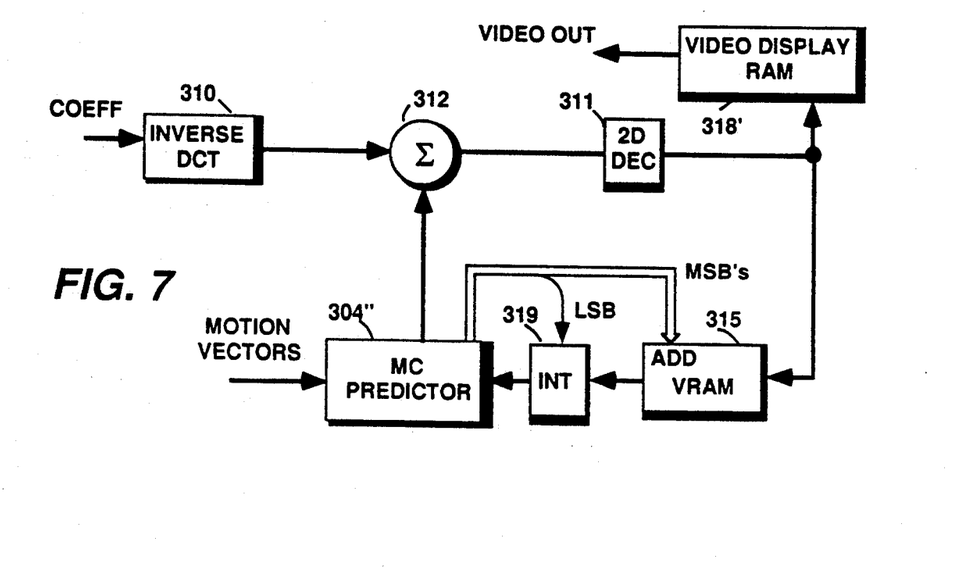

FIG. 7 illustrates a further embodiment, which is similar to the FIG. 5 embodiment, in that it provides the half pixel resolution enhancement. The FIG. 7 apparatus has the decimator 311 moved to the connection between the output of the adder 312 and the input to the VRAM's. This eliminates the necessity for a decimator between the predictor 304 and the adder 312, and thus is somewhat less hardware intensive than the FIG. 5 apparatus. However in this embodiment the adder is required to perform 8 times 8 or 64 additions per block as opposed to 4 times 4 or 16 additions per block. The remainder of the circuitry operates in the same manner as the corresponding circuitry in FIG. 5.

A variation on the FIG. 7 circuitry may be realized by connecting the VRAM 315 directly to the predictor 304" and interposing the interpolator 319 between the predictor 304" and the adder 312.

Figure 8:
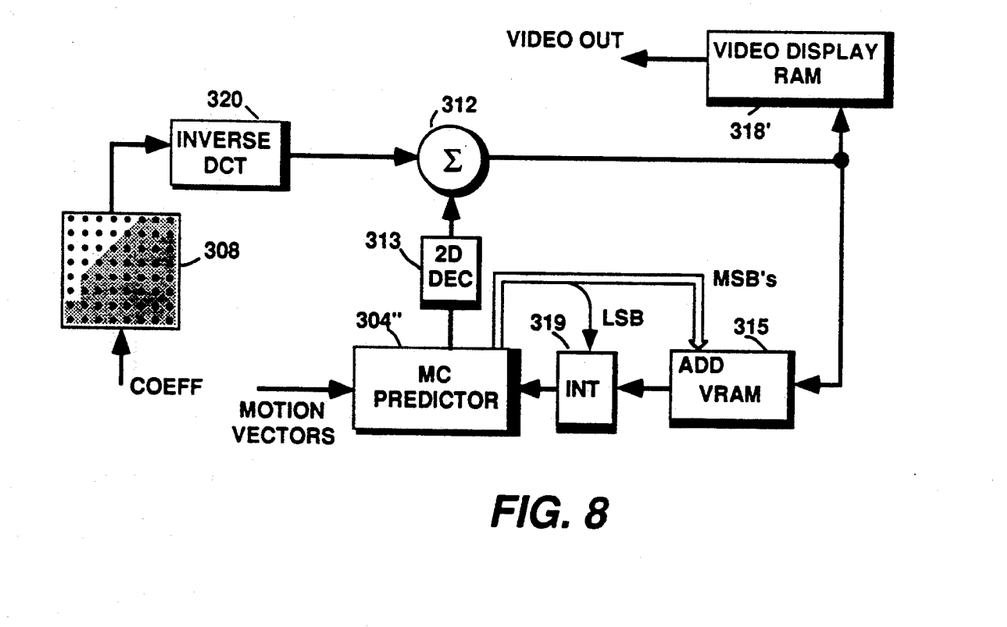

FIG. 8 illustrates the preferred embodiment, which not only realizes a reduction in the size of the VRAM's, but also a reduction in the complexity of the IDCT 320. In the FIG. 8 apparatus, decimation of the pixel matrices is performed directly in the IDCT 320. That is, the IDCT provides decimated blocks of pixel values to the adder 312, and as a result the remainder of the circuit is arranged and operates similar to the FIG. 5 apparatus. Data provided to the IDCT 320 are a sequence of coefficients representing the spatial frequency spectra of image areas represented by matrices of 8 by 8 pixels. In this example the respective frequency spectra for respective image areas are represented by up to 64 coefficients, depending upon the image content. If the number of coefficients provided to the IDCT are lessened, the spatial resolution of the image areas represented by the pixel matrices output by the IDCT is concomitantly lessened. Because the spatial resolution is reduced the image areas can be represented with a fewer number of pixels without further affecting the image quality. If the image area can be represented with fewer pixels, the IDCT can be arranged to calculate fewer output values.

Assuming that the system of FIG. 8 is to provide images corresponding to a decimation, by a factor of two in both the vertical and horizontal directions, of the transmitted information, the IDCT 320 is arranged to calculate 4 by 4 matrices of output values from the 8 by 8 matrices of input coefficients. This translates into a significant hardware savings in the IDCT as well as lowering the requisite speed of operation of the IDCT. The IDCT 320 is supplied with 4 by 4 matrices of coefficients selected from the 8 by 8 matrices of transmitted coefficients. This selection of 4 by 4 matrices of coefficients is accomplished by the coefficient masking apparatus 308 shown in FIG. 8. The element 308 is illustrated as a box with a matrix of 8 by 8 dots. Each of the dots represents a coefficient. The shaded portion of dots is meant to indicate the coefficients which are discarded or not applied to the IDCT. The importance of each of the coefficients to image reconstruction is known a priori. Hence the designer is free to select those coefficients for processing which he believes will be most beneficial to image reproduction. In the nominal MPEG signal format, the coefficients occur in ascending order of frequency spectra, and with respect to the matrix illustrated, occur in a zig-zag arrangement. Therefore, in the simplest case, one need only select the first 16 coefficients transmitted for each image area.

Decimation in the FIG. 8 apparatus is effectively performed in the frequency domain, hence antialias filters are not required in the processing chain, except as may be desired in the decimator 313.

Figure 9:
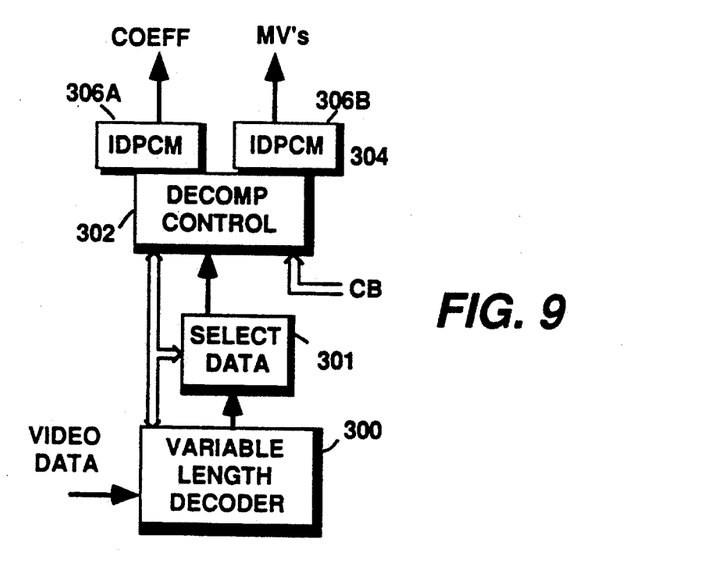
FIG. 9 is a block diagram of the coefficient masking apparatus 308 of FIG. 8.

The masking function may be performed in the decompression controller 302 (FIG. 3), as indicated by the added element 301 in FIG. 9. Note, element 301 may be a distinct hardware apparatus, or its function may be programmed in the controller 302. The masking process is illustrated by the flow chart in FIG. 10.

The masking function is one of monitoring available data and selecting a predetermined portion of it. Assuming the data to be in MPEG format, it is layered as indicated in FIG. 1. This data includes header data down to the block level. All of the header data is required by the decompression controller, and thus element 301 is conditioned to pass all header data. At the block level the data comprises DCT coefficients or EOB codes. Depending on the image content, each block may contain from one to 64 coefficients, with the last non-zero coefficient followed by an EOB code. If a block includes more than 16 coefficients, the apparatus 301 will pass the first 16 coefficients, then an EOB code, and discard the following coefficients included in the block. The end of the block is recognized at the occurrence of the original EOB code. At this point data for the next successive block commences, and the first 16 coefficients are selected etc.

Figure 10:
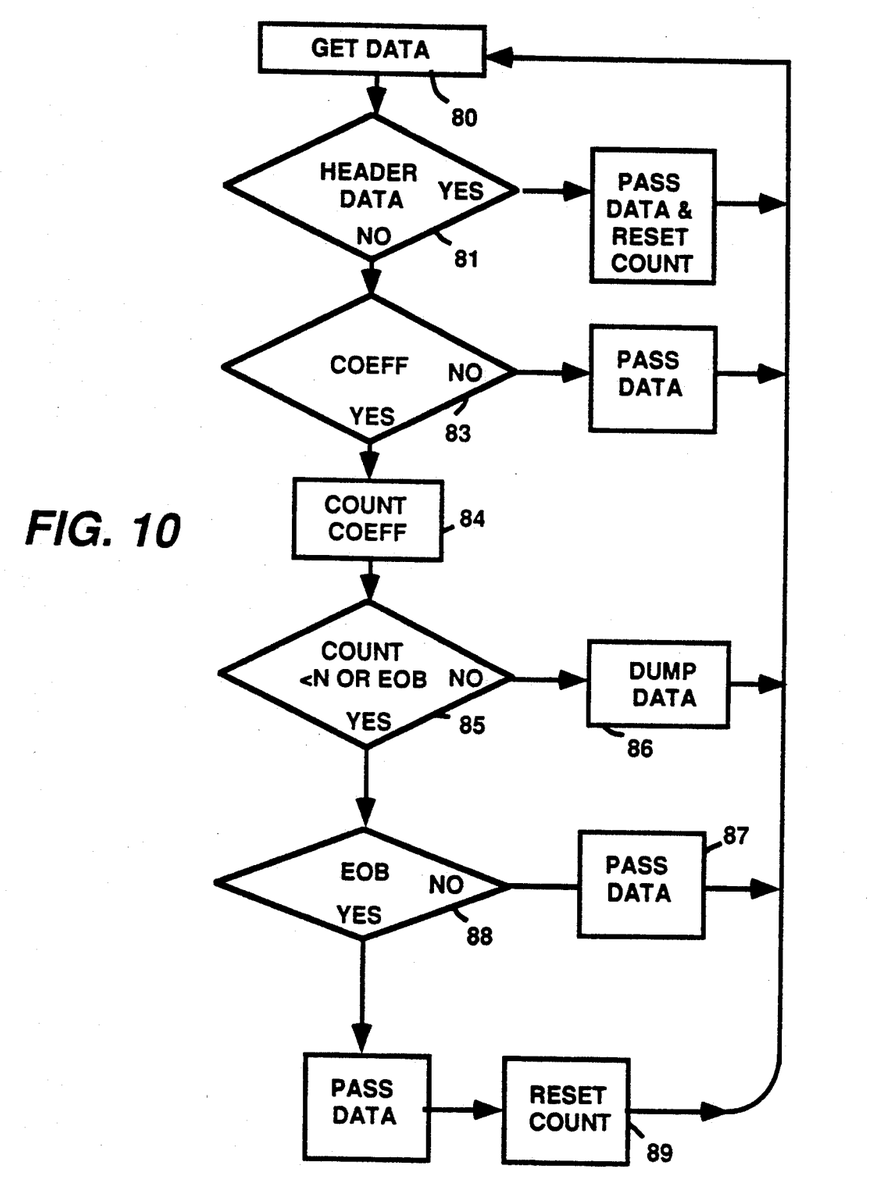
FIG. 10 is a flow chart of the operation of a portion of the FIG. 7 apparatus.

Referring to FIG. 10, data from the decoder 300 is acquired (80) and examined (81). If the data is header data, it is passed on to the controller 302 and a count (84) is reset to zero. If the data is not header data, it is examined (83) to determine if it is coefficient data. If is not coefficient data (e.g. it may be motion vector data etc.) it is passed to the controller 302. If it is coefficient data, a count value is incremented (84). The count value is examined and the data is examined (85) to determine if it is an EOB code. If the count value is greater than N (in this example N=16), the data is discarded (86) until an EOB occurs which also is discarded, because it is excess data. If the count value is less than N the data is examined (88) to determine whether it is an EOB. If it is not an EOB it is passed (87) to the controller an the next dataword is examined (81). If it is an EOB, indicating that the all the remaining coefficients in the block are zero valued, the EOB is passed to the controller 302 and the count is reset to zero (89) in preparation for the start of data for the next successive block of data. If at step 85 the count value is equal to N, the dataword causing the count to increment to N is replaced with an EOB.

Figure 8A:
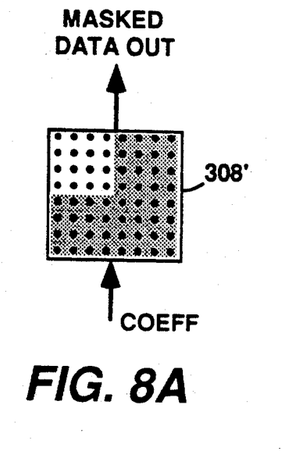
FIGS. 8A, 8B and 8C are exemplary alternative masking functions which may be implemented in element 308 of FIG. 8.
Figure 8B:
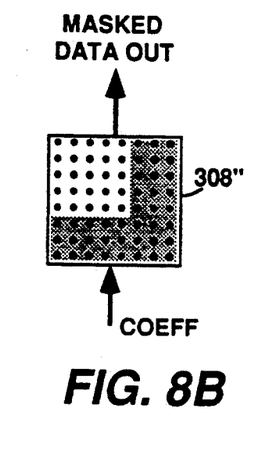
Figure 8C:
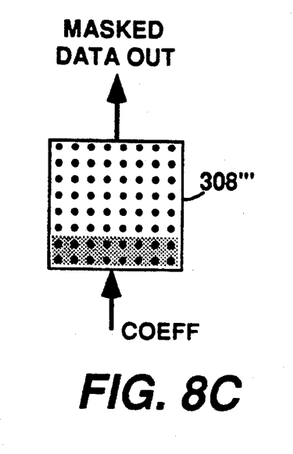

FIGS. 8A, 8B and 8C show possible alternative masking functions for the coefficient data. The masking function of FIG. 8C will result in the spatial frequency response in the vertical and horizontal dimensions being different. Such a masking function may be employed in the instance where, for example, a 4 by 3 image is to be converted to a 16 by 9 image.

The foregoing description has used a decimation factor of 2 in the horizontal and vertical dimensions, however the invention is not limited to factors of two. In general any decimation factor from one to eight may be used, through the two extremes are of little utility.

What is claimed is:

1. Apparatus for decompressing compressed video data occurring in blocks representing respective image areas of successive frames with a first spatial resolution, and wherein each frame consists of a plurality of distinct image areas, said apparatus including memory means for storing decompressed video data, means for decompressing respective blocks of data to produce decompressed video signal representing corresponding image areas with a second spatial resolution lower than said first spatial resolution, and means for storing said decompressed video signal in said memory means.

2. The apparatus set forth in claim 1 wherein said compressed video data occurs in blocks of codewords representing M by M pixels, and said decompression means produces blocks of N by N pixels representing said image areas, where M and N are integers with M greater than N.

3. The apparatus set forth in claim 1 wherein said blocks of compressed video data consist of coefficients generated by performing a discrete cosine transform over M by M matrices of pixel values, and said means for decompressing includes inverse discrete cosine transform means for performing inverse discrete cosine transforms over N by N matrices of discrete cosine transform coefficients, and means responsive to said coefficients generated by performing a discrete cosine transform over M by M matrices of pixel values for providing N by N matrices of coefficients to said means for performing inverse discrete cosine transforms for respective image areas, where M and N are integers and M is greater than N.

4. The apparatus set forth in claim 1 wherein said means for decompressing respective blocks of data includes;
- a first decimator having an input terminal for receiving said blocks of compressed video signal and having an output terminal, said first decimator for providing N by N matrices of compressed video signal values from M by M matrices of compressed video signal values.
- summing means, having a first input terminal coupled to the output terminal of said first decimator, having a second input terminal, and having an output terminal coupled to said memory means;
- interpolation means having an input terminal coupled to said memory means and having an output terminal, for generating M by M matrices of pixel values from N by N matrices of pixel values accessed from said memory means;
- a video signal motion compensated predictor having an input terminal coupled to the output terminal of said interpolation means, and having an output terminal; and
- a second decimator coupled between said video signal motion compensated predictor and the second input terminal of said summing means, for generating N by N matrices of pixel values from M by M matrices of pixel values provided from said video signal motion compensated predictor.

5. The apparatus set forth in claim 4 wherein said compressed video data includes motion vectors which are coupled to said video signal motion compensated predictor for conditioning said video signal motion compensated predictor to generate memory read addresses for accessing respective matrices of pixel values, and a least significant bit of said memory read addresses is coupled to control said interpolation means.

6. The apparatus set forth in claim 1 wherein said means for decompressing respective blocks of data includes;
- summing means, having a first input terminal coupled for receiving said blocks of compressed video data, having a second input terminal, and having an output terminal;
- a decimator having an input terminal coupled to the output terminal of said summing means and having an output terminal coupled to an input terminal of said memory means, said decimator for providing N by N matrices of values from M by M matrices of values provided from said summing means;
- interpolation means having an input terminal coupled to said memory means and having an output terminal, for generating M by M matrices of pixel values from N by N matrices of pixel values accessed from said memory means;
- a video signal motion compensated predictor having an input terminal coupled to the output terminal of said interpolation means, and having an output terminal to the second input terminal of said summing means.

7. The apparatus set forth in claim 6 wherein said compressed video data includes motion vectors which are coupled to said video signal motion compensated predictor for conditioning said video signal motion compensated predictor to generate memory read addresses for accessing respective matrices of pixel values, and a least significant bit of said memory said addresses is coupled to control said interpolation means.

8. The apparatus set forth in claim 1 wherein said means for decompressing respective blocks of data includes;
- summing means, having a first input terminal coupled for receiving said blocks of compressed video data, having a second input terminal, and having an output terminal;
- a decimator having an input terminal coupled to the output terminal of said summing means and having an output terminal coupled to an input terminal of said memory means, said decimator for providing N by N matrices of values from M by M matrices of values provided from said summing means;
- a video signal motion compensated predictor having an input terminal coupled to said memory means, and having an output terminal; and
- interpolation means having an input terminal coupled to the output terminal of said video signal motion compensated predictor and having an output terminal coupled to the second input terminal of said summing means, for generating M by M matrices of pixel values from N by N matrices of pixel values provided by said video signal motion compensated predictor.

9. The apparatus set forth in claim 8 wherein said compressed video data includes motion vectors which are coupled to said video signal motion compensated predictor for conditioning said video signal motion compensated predictor to generate memory read addresses for accessing respective matrices of pixel values, and at least significant bit of said memory read addresses is coupled to control said interpolation means.

10. The apparatus set forth in claim 1 wherein said blocks of compressed video data consist of coefficients generated by performing a transform over M by M matrices of pixel values, and said means for decompressing includes inverse transform means for performing inverse transforms over N by N matrices of transform coefficients, and means, responsive to said coefficients generated by performing a transform over M by M matrices of pixel values, for providing N by N matrices of coefficients to said means for performing inverse transforms for respective image areas, where M and N are integers and M is greater than N.

11. The apparatus set forth in claim 10 wherein said apparatus further includes:
- summing means, having a first input terminal coupled to said inverse transform means, having a second input terminal, and having an output terminal coupled to said memory means; and
- a video signal motion compensated predictor coupled between said memory means and said second input of said summing means.

12. The apparatus set forth in claim 11 further including;
- interpolation means coupled between said memory means and said video signal motion compensated predictor, for generating M by M matrices of pixel values from N by N matrices of pixel values accessed from said memory means; and a decimator coupled between said video signal motion compensated predictor and the second input terminal of said summing means, for generating N by N matrices of pixel values from M by M matrices of pixel values provided from said video signal motion compensated predictor.

13. The apparatus set forth in claim 12 wherein said compressed video data includes motion vectors which are coupled to said video signal motion compensated predictor for conditioning said video signal motion compensated predictor to generate memory read addresses for accessing respective matrices of pixel values, and a least significant bit of said memory read addresses is coupled to control said interpolation means.

14. Apparatus for decompressing compressed video data occurring in blocks representing respective image areas of successive frames with a first spatial resolution to produce decompressed video signal representing corresponding image areas with a second spatial resolution lower than said first spatial resolution, said block of video data including $M \times N$ matrices of transform coefficients representing $M \times N$ matrices of pixel values, and including motion vectors having a spatial resolution at least equal to the first spatial resolution of said pixels, said apparatus comprising:

a source of blocks of $M \times N$ matrices of transform coefficients;

means including inverse transform means responsive to said blocks of $M \times N$ transform coefficients for generating corresponding $S \times R$ matrices of values (M, N, S and R are integers with $M \times N > S \times R$);

means including a motion compensated predictor responsive to said $R \times R$ matrices of values and said motion vectors for generating $S \times R$ matrices of pixel values representing respective image areas with said second spatial resolution, said motion compensated predictor including means for substantially conforming spatial resolutions of the motion vectors and the $S \times R$ matrices of values; and memory means for storing respective $S \times R$ matrices of pixel data.

15. The apparatus set forth in claim 14 wherein said means including a motion compensated predictor further includes:

summing means, having a first input terminal coupled to said inverse transform means, having a second input terminal coupled to an output terminal of said motion compensated predictor, and having an output terminal coupled to said memory means.

16. The apparatus set forth in claim 14 wherein said means including inverse transform means further includes:

masking apparatus, coupled to said source of blocks of $M \times N$ matrices of transform coefficients, for providing only S times R coefficients to said inverse transform means; and wherein said inverse transform means is arranged to process $S \times R$ coefficients to provide $S \times R$ transformed values.

17. The apparatus set forth in claim 14 wherein said means including inverse transform means further includes:

means coupled to said source of blocks of $M \times N$ matrices of transform coefficients applied to said inverse transform means; and wherein said inverse transform means provides $M \times N$ matrices of transformed values for corresponding blocks of $M \times N$ coefficients; and decimation means coupled to said inverse transform means for decimating $M \times N$ matrices of transformed values to said $S \times R$ matrices of values.

18. The apparatus set forth in claim 14 wherein said means including a motion compensated predictor further includes:

interpolation means associated with said motion compensated predictor for generating $M \times N$ matrices of pixel values from $S \times R$ matrices of pixel values accessed from said memory means.

19. The apparatus set forth in claim 18 wherein said means including a video signal motion compensated predictor further includes:

a decimator coupled between said video signal motion compensated predictor and the second input terminal of said summing means, for providing $S \times R$ matrices of pixel values to said summing means.

20. The apparatus set forth in claim 18 wherein said motion vectors are coupled to said motion compensated predictor for conditioning said motion compensated predictor to generate memory read addresses for accessing respective matrices of pixel values, and a least significant bit of said memory read addresses is coupled to control said interpolation means.

* * * * *